(12) United States Patent
Faivre et al.

(10) Patent No.: US 10,889,241 B2
(45) Date of Patent: Jan. 12, 2021

(54) DEVICE FOR CONTROLLING A MATRIX OF LIGHT SOURCES FOR INTERIOR LIGHTING OF THE PASSENGER COMPARTMENT OF A MOTOR VEHICLE

(71) Applicant: VALEO VISION, Bobigny (FR)

(72) Inventors: Arnaud Faivre, Bobigny (FR); Birane Gaye, Bobigny (FR); Jerome Le Corre, Bobigny (FR); Pierre-Louis Tassy, Bobigny (FR); Thierry Fleurence, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/481,346

(22) PCT Filed: Jan. 22, 2018

(86) PCT No.: PCT/EP2018/051478
§ 371 (c)(1),
(2) Date: Jul. 26, 2019

(87) PCT Pub. No.: WO2018/138059
PCT Pub. Date: Aug. 2, 2018

(65) Prior Publication Data
US 2019/0389372 A1    Dec. 26, 2019

(30) Foreign Application Priority Data

Jan. 26, 2017   (FR) ...................... 17 50618

(51) Int. Cl.
*B60Q 3/80*    (2017.01)
*B60Q 3/74*    (2017.01)
*H05B 45/20*   (2020.01)

(52) U.S. Cl.
CPC ............... *B60Q 3/80* (2017.02); *B60Q 3/74* (2017.02); *H05B 45/20* (2020.01)

(58) Field of Classification Search
CPC ... B60Q 3/16; B60Q 3/18; B60Q 3/82; B60Q 3/80; B60Q 3/85; B60Q 3/20; B60Q 3/74;
(Continued)

(56) References Cited

U.S. PATENT DOCUMENTS

| 6,982,648 B2 * | 1/2006 | Cros | ...................... | B60Q 11/00 307/10.8 |
| 7,220,029 B2 * | 5/2007 | Bynum | .................... | B60Q 3/82 362/269 |

(Continued)

FOREIGN PATENT DOCUMENTS

| DE | 10 2011 013 777 A1 | 11/2011 |
| WO | WO 2008/024985 A2 | 2/2008 |

OTHER PUBLICATIONS

International Search Report dated May 11, 2018 in PCT/EP2018/051478 filed on Jan. 22, 2018.

*Primary Examiner* — Haissa Philogene
(74) *Attorney, Agent, or Firm* — Oblon, McClelland, Maier & Neustadt, L.L.P.

(57) ABSTRACT

A device for controlling a matrix of light sources of a luminous module for lighting the interior of the passenger compartment of a motor vehicle. The device includes a central unit configured to receive an instruction to activate one among a plurality of preset functions for lighting the passenger compartment, and functionally connected to a plurality of command devices, each of which is configured to command the activation of a group of light sources of the matrix. The central unit is configured to select a plurality of light sources of the matrix to activate to produce the lighting function, and to transmit instructions to the command devices in order to command the activation of the selected light sources.

11 Claims, 1 Drawing Sheet

(58) Field of Classification Search
CPC ...... H05B 45/20; H05B 45/185; H05B 45/00; F21Y 2113/00; F21Y 2113/10; F21Y 2115/10
See application file for complete search history.

(56) References Cited

U.S. PATENT DOCUMENTS

| | | | |
|---|---|---|---|
| 9,231,475 B2 * | 1/2016 | Takahashi | H05B 45/37 |
| 10,539,330 B2 * | 1/2020 | Buriola | H05B 45/00 |
| 10,696,219 B2 * | 6/2020 | Fleurence | B60Q 3/76 |
| 2008/0219017 A1 | 9/2008 | Cruickshank | |
| 2009/0289579 A1 | 11/2009 | Zielinski et al. | |
| 2014/0226303 A1 | 8/2014 | Pasdar | |
| 2017/0240105 A1 * | 8/2017 | Lecorre | B60Q 3/51 |
| 2020/0149698 A1 * | 5/2020 | Albou | H05B 45/10 |

* cited by examiner

DEVICE FOR CONTROLLING A MATRIX OF LIGHT SOURCES FOR INTERIOR LIGHTING OF THE PASSENGER COMPARTMENT OF A MOTOR VEHICLE

TECHNICAL FIELD

The invention relates to lighting systems for motor vehicles. The invention in particular relates to a system for lighting the interior of a passenger compartment of a motor vehicle.

BACKGROUND

Summary

A light-emitting diode, LED, is an electronic component capable of emitting light when it is passed through by an electrical current. The light intensity emitted by an LED is in general dependent on the magnitude of the electrical current flowing therethrough. Inter alia, an LED is characterized by a current magnitude threshold value. This maximum forward current generally decreases as temperature increases. Likewise, when an LED is emitting light, a voltage drop equal to its forward voltage is observed across its terminals. In the motor-vehicle field, LED technology is increasingly used in various luminous signaling solutions. LEDs are used to produce lighting functions such as daytime running lights, signaling lights, etc. It has also been proposed to use the technology of LEDs to produce systems for lighting the passenger compartment of a motor vehicle. As known, such systems comprise a ceiling light and reading lights. Typically in the case of a ceiling light, it is for example possible to activate a light that illuminates the driver side and, separately, a light that illuminates the passenger side. In order to decrease the number of lighting devices necessary to produce all the required luminous functions, it has been proposed to use at least one LED-comprising matrix. The matrix is configured to produce, depending on its operating mode, a plurality of functions including the reading-light function, left/right ceiling light function and so on. This makes it potentially possible to employee a single luminous device, instead of employing one specific device per function.

However, given the high number of light sources involved in such a matrix and the high number of luminous functions that may be required in the interior of the passenger compartment of a motor vehicle, commanding the light sources and driving their electrical supply requires complex electronic systems the maintenance of which may in particular prove to be complicated.

The objective of the invention is to mitigate at least one of the problems caused by the prior art. More precisely, the objective of the invention is to facilitate the command of a matrix of light sources that serves to produce a plurality of heterogenous luminous functions within a passenger compartment of a motor vehicle.

One subject of the invention is a device for controlling a matrix of light sources of a luminous module for lighting the interior of the passenger compartment of a motor vehicle. The control device is noteworthy in that it comprises a central unit configured to receive an instruction to activate one among a plurality of preset functions for lighting the passenger compartment. The central unit is functionally connected to a plurality of command devices, each of which is configured to command the activation of a group of light sources of said matrix. The central unit is configured to select a plurality of light sources of the matrix to activate to produce said lighting function, and to transmit instructions to the command devices in order to command the activation of the selected light sources.

Preferably, the central unit may comprise a microcontroller element and means for receiving and transmitting data.

The central unit may preferably comprise a memory element containing structured data, which associate each instruction to activate a lighting function with a preset group of light sources of the matrix to be activated to produce said lighting function.

Alternatively or in addition, the central unit may preferably be configured to determine a group of light sources of the matrix to activate to produce said lighting function.

The activation instructions may preferably comprise a setpoint for the colour or colour temperature of the light to be emitted, a plurality of coordinates, and/or a light-intensity setpoint. The coordinates may advantageously correspond to a top left-hand corner and a bottom right-hand corner defining a group of light sources to be turned on.

Preferably, the central unit may be arranged to select, on reception of an activation instruction, one or more of the plurality of command devices to be activated depending on this activation instruction, and to transmit to each selected command device a setpoint for the current to be delivered to the groups of light sources that this device commands depending on this instruction.

The central unit may preferably be arranged to calculate said setpoint on the basis of the received instruction and depending on one or more of the following parameters:

the position of the selected light sources in the passenger compartment;

the zone intended to be illuminated by the selected light sources;

the position of the luminous segments projected using the light emitted by the selected light sources in the lighting function produced by the luminous module (for example, the central unit may calculate a first intensity setpoint intended for one or more light sources associated with first segments, and in particular with the segments at the centre of the function, and a second intensity setpoint intended for one or more light sources associated with second segments, and in particular segments on the edges of this function, so as to compensate for inequalities in the optical efficiency of an optical system associated with the matrix of light sources, in order to ensure the light beam output from such an optical system is of uniform light intensity), the intrinsic characteristics of the selected light sources, for example their bin information (colour and/or flux), and the characteristics of the optical means coupled to the selected light sources, for example the optical efficiency of these optical means.

Preferably, each command device may be connected to a supply line and may be configured to receive a setpoint for the current to deliver to the group of light sources that it commands and to modulate and transmit said supply to this group depending on said current setpoint.

The central unit may preferably be configured to receive data over a controller area network (CAN) or local interconnect network (LIN) bus of a motor vehicle.

Preferably, each of the command devices may comprise a circuit for converting voltage and/or a circuit for regulating electrical current. As a variant, only the central unit comprises a circuit for converting voltage.

Each of the command devices may preferably comprise a microcontroller element functionally connected to the converting circuit.

Preferably, each command device may be configured to command the activation with electrical current of a group among the light sources of the matrix.

Said groups may preferably be separate groups. Alternatively, the groups may not be separate, so that one or more of the light sources of the matrix belongs to a plurality of groups.

Preferably, each group may comprise the light sources of one row or one column of the matrix. As a variant, each group may comprise a single light source, or a plurality of light sources distributed over the various rows and/or columns of the matrix.

Each light source of the matrix may preferably comprise at least two elementary light sources having different luminous properties.

Where appropriate, each group may comprise a single of the elementary light sources of the light sources of this group, or as a variant, one of the elementary light sources of one or more of the light sources of this group and the other of the elementary light sources of one or more other of the light sources, or as a variant both elementary light sources of the light sources of this group.

One of the elementary light sources of each light source may preferably emit light of a first preset colour, and the other of the elementary light sources may emit light of a second preset colour, when the sources are supplied with electrical current.

Preferably, the first colour may be warm white and the second colour is cold white. The cold white may correspond to a colour temperature comprised between 4500 and 6000 K. The warm white may correspond to a colour temperature comprised between 2700 and 3000 K.

Each of the elementary sources may preferably be commanded separately and independently of the other elementary sources of the light source by the command devices associated therewith.

Preferably, each elementary source may comprise a light ray emitting face of an electroluminescent semiconductor element.

The light sources of the matrix may preferably be arranged on at least two separate physical carriers. It is preferably a question of two printed circuit boards installed in two different locations in the passenger compartment of a motor vehicle.

The dimensions of the matrix may preferably allow at least five rows/columns each comprising at least six light sources to be accommodated.

Another subject of the invention is a luminous module for lighting the interior of the passenger compartment of a motor vehicle. The module comprises at least one matrix of light sources, and it is noteworthy in that it comprises a device for controlling said matrix, the control device being according to the invention.

The luminous module may preferably comprise optical means, each light source being coupled to one optical means, the optical means being arranged to project, from the light emitted by the light source coupled thereto, a luminous segment into a specific zone of the passenger compartment.

Preferably, the optical means may be arranged so that each luminous segment covers at least one portion of another adjacent luminous segment.

The optical means may preferably comprise at least one optical lens or one light guide.

Using the measures proposed by the present invention, it becomes possible to control a plurality of light sources, for example a plurality of light-emitting diodes (LEDs), commanded and driven by a plurality of command devices, using one central control unit. In the case of application to lighting the passenger compartment of a motor vehicle, the proposed architecture in particular allows a high-level setpoint threshold to be received from a control member of the vehicle by the central control unit. The high-level setpoint serves to identify the required luminous function. The central control unit is configured to translate the high-level setpoint thus received into low-level setpoints, for example indicating a precise magnitude of a current, to the plurality of command devices involved in the supply of the matrix of LEDs. The proposed approach therefore allows LED matrix systems to be scaled for the production of multiple luminous functions (screened light, reading light, directional ambient light, etc.), without however requiring changes to the devices for commanding and driving the LEDs.

BRIEF DESCRIPTION OF THE DRAWINGS

Other features and advantages of the present invention will be better understood from the example description and the drawings in which.

DESCRIPTION OF THE PREFERRED EMBODIMENTS

Unless otherwise indicated, the technical features described in detail for one given embodiment may be combined with the technical features described in the context of other embodiments described by way of example and nonlimitingly. Similar reference numbers will be used to reference similar concepts throughout various embodiments of the invention. For example, the references 110 and 210 designate a central unit of a control device according to the invention, in two described embodiments.

Figure 1:
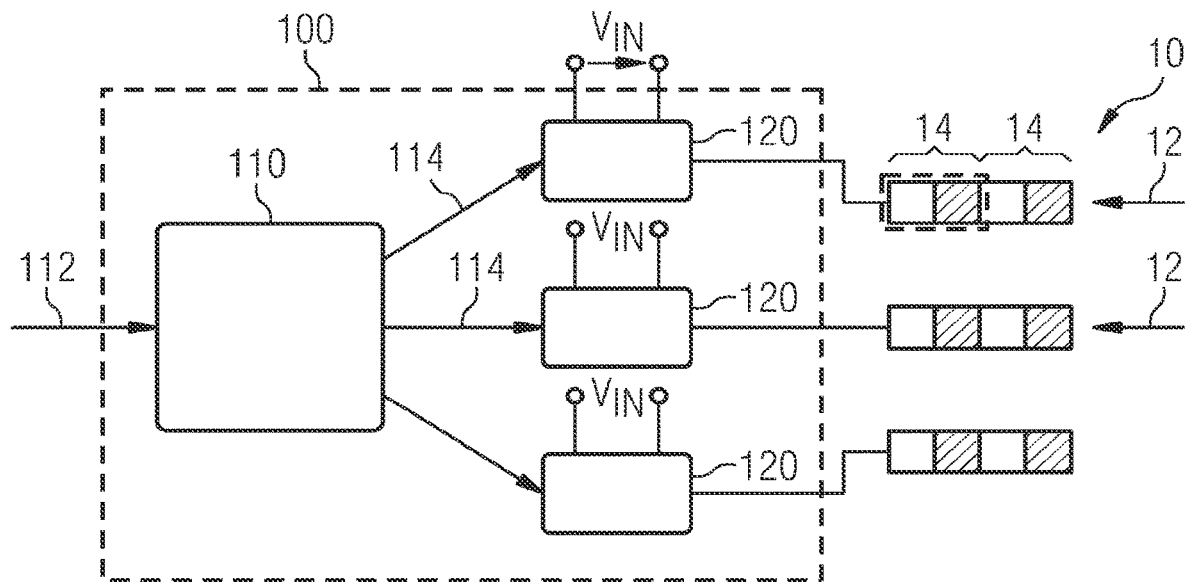
FIG. 1 is a schematic illustration of a control device according to the invention in one preferred embodiment.

FIG. 1 shows a control device 100 according to one preferred embodiment of the invention. The device 100 serves to control a matrix 10 containing light sources 14 in the interior of the passenger compartment of a motor vehicle. The light sources 14 serve to produce a plurality of lighting functions in the passenger compartment. It is a question nonlimitingly and inter alia of a reading-light function, of a night-light function, of a welcome-light function The schematic of FIG. 1 shows the light sources 14 by indicating their light ray emitting faces. The matrix arrangement of the sources may be seen. Preferably, the light sources 14 are light-emitting diodes (LEDs). By using LEDs having varied characteristics to populate the matrix 10, it becomes possible to produce a plurality of luminous functions by making the decision to supply sub-sets of these light sources.

For example, a given matrix 10 may contain light sources of a first type that emit a light of a first colour (for example warm white) when they are supplied with electrical current, and light sources of a second type, which emit a light of a second colour (for example cold white). A single electronic component containing two or more electroluminescent semiconductor elements having different electrical and/or luminous characteristics may moreover be used.

In FIG. 1, the light sources of the two different types are indicated by the presence and absence of a hatched pattern, respectively. The arrangement of the matrix is such that the light sources are physically close together, so that two sources are not visibly distinguishable by a passenger of the vehicle equipped with the matrix. Depending on the number, on the type of sources, on their position in the matrix, and on the light intensity emitted by the light sources turned on at a given moment, the matrix 10 is therefore capable of producing a plurality of different luminous functions.

One key aspect for the production of these multiple luminous functions is the way in which the supply of electrical current to each of the sources is driven. By way of example and nonlimitingly, the light sources of a row 12 of the matrix 10 are supplied by one of the command devices 120. Each of the command devices 120 is able to convert an input DC voltage $V_{IN}$, in general delivered by an internal source of the motor vehicle equipped with the device 10, into a load voltage that is suitable for supply to the light sources 12 associated therewith. The operation of such devices for commanding or driving the electrical supply will not be described in detail in the context of the present invention, since it is known per se in the art. Thus, the command devices generally employ at least a buck voltage converter, boost voltage converter or single-ended primary inductance converter. Furthermore, the average magnitude of the load current may be influenced as is known by a pulse width modulation (PWM) signal. As the average magnitude of the load current has a direct impact on the light intensity emitted by the supplied LEDs, it may be seen that by controlling the command devices 120 in a centralized and concerted way, a selection of the LEDs 14 of the matrix may lead to light of a preset intensity and of a preset colour temperature being emitted.

The command devices 120 preferably comprise at least one voltage converting circuit able to convert to said input voltage $V_{IN}$ into said load voltage and one current regulating circuit able to generate a PWM signal according to a current setpoint 114 intended for the light sources 12 that are associated therewith. Preferably, the command devices 120 also comprise receiving means that allow such a current setpoint 114 to be received.

The current setpoints 114 are transmitted in a centralized way to the various command devices 120 by a central unit 110. Although FIG. 1 shows a direct link between the central unit 110 and each of the command devices 120, a serial connection of the command devices is envisionable equivalently and without however departing from the scope of the present invention. The central unit 110 is configured to determine, on the basis of an activation instruction 112 received by an external member indicating a lighting function, which of the light sources 14 of the matrix 10 are to be supplied and with what magnitude of current, to produce the required lighting function. Next, a current setpoint 114 is transmitted to the command devices 120 that are responsible for delivering the magnitude of current specified by the setpoint 114 to the selected light sources.

Figure 2:
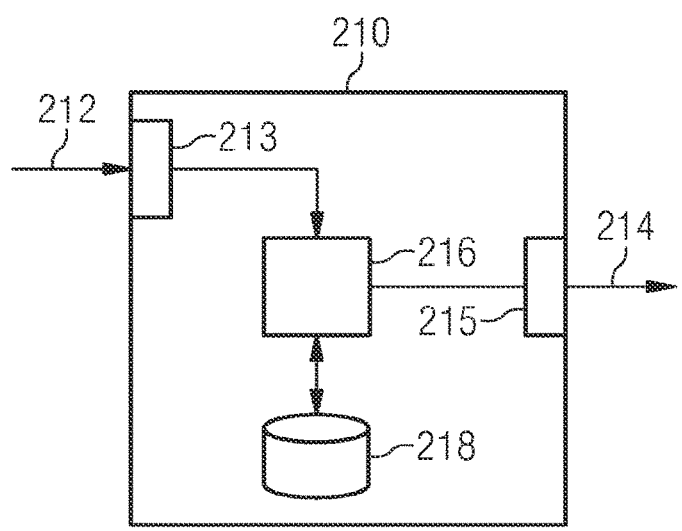
FIG. 2 is an illustration of a central unit of a control device according to the invention in one preferred embodiment.

FIG. 2 shows a schematic illustration of the central unit 210 according to one preferred embodiment of the invention. An activation indication 212 is received, for example over a CAN or LIN bus of a motor vehicle, using data-receiving means 213. The activation indication 212 comprises, by way of example and nonlimitingly, a colour setpoint, coordinates (for example indicating a top left-hand corner and a bottom right-hand corner of a rectangular group of sources 14 of the matrix 10), and/or a light-intensity setpoint. A microcontroller element 216 programmed to this end interprets the received indication 212 in order to determine all the setpoints 214. The setpoints 214 are transmitted to each of the command devices 120 using transmitting means 215.

The central unit may preferably be arranged to calculate said setpoint on the basis of the received instruction and depending on one or more of the following parameters:
  the position of the selected light sources in the passenger compartment;
  the zone intended to be illuminated by the selected light sources;
  the position of the luminous segments projected using the light emitted by the selected light sources in the lighting function produced by the luminous module (lower intensity for the segments at the centre of the function than for the segments at the edges of this function),
  the intrinsic characteristics of the selected light sources, for example their bin information, and
  the characteristics of the optical means coupled to the selected light sources, for example the optical efficiency of these optical means.

The central unit 210 preferably comprises a memory element 218 to which the microcontroller element 216 has read access. This memory element is preloaded with the data required to determine said setpoint 214. It is for example a question of data relating to the location of the sources 14 in the passenger compartment, of the intrinsic characteristics of the light sources 14, etc.

In another embodiment, the memory element 218 is a structured memory element, such as a table. The table is preloaded with preset configurations, which relate an activation indication 212 to a setpoint 214 for each of the command devices. In this way, a simple operation of consulting the table allows all of the command devices to be configured so that the latter activate the preselected light sources. Using the functional and structural description that has just been given, a person skilled in the art will be able to program a microcontroller so that the latter is able to perform the functions of the microcontroller element 216, using his general knowledge of IT.

The control device according to the invention is particularly applicable to a luminous module for lighting the interior of the passenger compartment of a motor vehicle. In such a module, each light source of the matrix is coupled to an optical means such as an optical lens or a light guide. The optical means make it possible to project, from the light emitted by the light source that is coupled thereto, a luminous segment into a specific zone of the passenger compartment. This arrangement allows beamwise, segmentwise, stripwise or even pixelwise turn-on of the various elements of the matrix. Ideally, each luminous segment covers at least one portion of another adjacent luminous segment, in order to produce continuous luminous lands when a plurality of adjacent luminous segments are turned on.

The invention claimed is:

1. A device for controlling a matrix of light sources of a luminous module for lighting the interior of the passenger compartment of a motor vehicle, the device comprising:
  a central unit configured to receive an instruction to activate one among a plurality of preset functions for lighting the passenger compartment, and functionally connected to a plurality of command devices, each of which is configured to command the activation of a group of light sources of the matrix, and
  the central unit is configured to select a plurality of light sources of the matrix to activate to produce the lighting function, and to transmit instructions to the command devices in order to command the activation of the selected light sources, wherein the central unit comprises a microcontroller element and a receiver and a transmitter for receiving and transmitting data, wherein the central unit comprises a memory element containing structured data, which associate each instruction to activate a lighting function with a preset group of light sources of the matrix to be activated to produce the lighting function, and wherein each light source of the matrix comprises at least two elementary light sources having different luminous properties.

2. A luminous module for lighting the interior of the passenger compartment of a motor vehicle, the luminous module comprising at least one matrix of light sources, wherein the luminous module comprises a device for controlling the matrix, the device being according to claim 1.

3. The luminous module according to claim 2, wherein the luminous module comprises optical elements, each light source being coupled to one optical element, the optical elements being arranged to project, from the light emitted by the light source coupled thereto, a luminous segment into a specific zone of the passenger compartment.

4. The device according to claim 1, wherein each of the command devices comprises a converting circuit for converting voltage and/or a circuit for regulating electrical current.

5. The device according to claim 4, wherein each of the command devices comprises a microcontroller element functionally connected to the converting circuit.

6. The luminous module according to claim 3, wherein the optical means elements are arranged so that each luminous segment covers at least one portion of another adjacent luminous segment.

7. The device according to claim 1, wherein one of the elementary light sources of each light source emits light of a first preset colour, and the other of the elementary light sources emits light of a second preset colour, when the sources are supplied with electrical current.

8. The device according to claim 7, wherein the first colour is warm white and the second colour is cold white.

9. The device according to claim 1, wherein each elementary source comprises a light ray emitting face of an electroluminescent semiconductor element.

10. The device according to claim 1, wherein each of the elementary sources is commanded separately and independently of the other elementary sources of the light source by the command devices associated therewith.

11. The device according to claim 1, wherein the light sources of the matrix are arranged on at least two separate physical carriers.

* * * * *